United States Patent [19]

Tsumura et al.

[11] Patent Number: 4,927,110
[45] Date of Patent: May 22, 1990

[54] SLIDE LOCKING DEVICE FOR A CAR SEAT

[75] Inventors: Kenji Tsumura, Ikeda; Yukifumi Yamada; Takami Terada, both of Kariya, all of Japan

[73] Assignees: Daihatsu Motor Co., Ltd., Osaka; Aishin Seiki Co., Ltd., Aichi, both of Japan

[21] Appl. No.: 380,509

[22] Filed: Jul. 17, 1989

[30] Foreign Application Priority Data

Jul. 25, 1988 [JP] Japan .................................. 63-98298

[51] Int. Cl.⁵ ........................................... F16M 13/00
[52] U.S. Cl. .................................... 248/430; 296/65.1
[58] Field of Search ............... 248/430, 429, 424, 419, 248/407; 296/65.1; 384/47; 297/344

[56] References Cited

U.S. PATENT DOCUMENTS

| | | | |
|---|---|---|---|
| 4,408,744 | 10/1983 | Thompson | 248/429 X |
| 4,635,890 | 1/1987 | Matsuda et al. | 248/429 |
| 4,660,795 | 4/1987 | Ikegaya et al. | 248/430 |
| 4,707,030 | 11/1987 | Harding | 248/430 X |
| 4,852,846 | 8/1989 | Weier | 248/430 |

Primary Examiner—Ramon O. Ramirez
Attorney, Agent, or Firm—Stevens, Davis, Miller & Mosher

[57] ABSTRACT

A slide locking device for a car seat, provided with a pair of lock plates fixed to a car body and having a plurality of locking retained portions, a pair of lock levers each having an engaging portion engageable with one of the retaining portions, and a pair of lock shafts for swingably supporting the lock levers, so that between the lock levers is stretched one tension coil spring for biasing the engaging portion of each lock lever in the direction of engaging with the retained portion at each lock plate.

4 Claims, 2 Drawing Sheets

FIG. 1
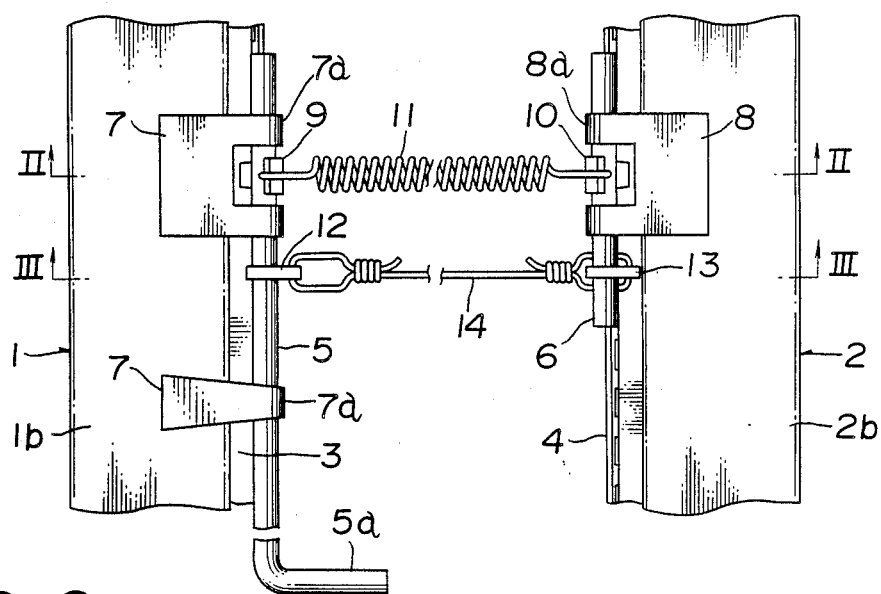
FIG. 2
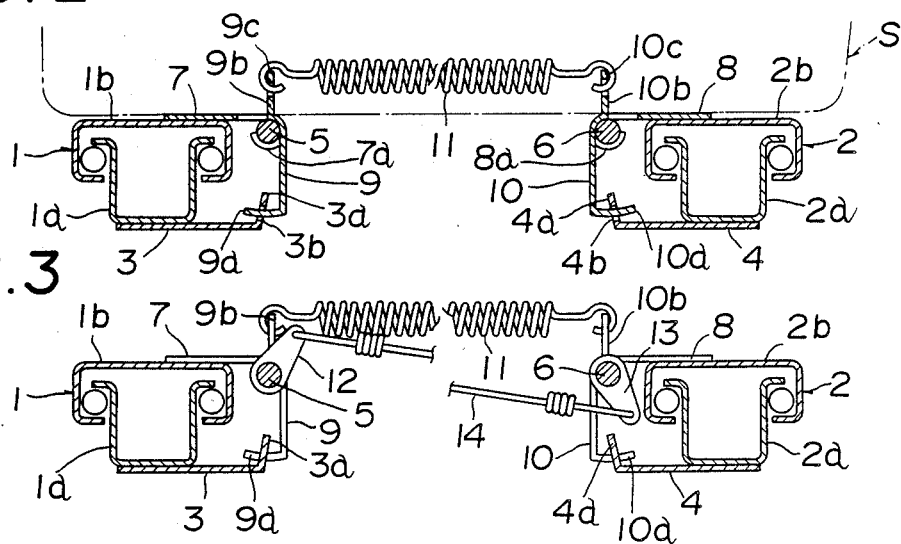
FIG. 3

SLIDE LOCKING DEVICE FOR A CAR SEAT

FIELD OF THE INVENTION

The present invention relates to a slide locking device for locking a slide of a car seat provided longitudinally slidably of a car body mainly of an automobile.

BACKGROUND OF THE INVENTION

Conventionally, a car seat for an automobile is made slidable longitudinally of a body thereof by use of slide rails comprising a pair of upper rails fixed to both sides of the lower surface of the seat and a pair of lower rails fixed to the car body at the positions corresponding to the upper rails respectively as disclosed in the Japanese Utility Model Laid-Open Gazette No. Sho 60-43,435. Also, a slide locking device for locking the car seat slidable through the slide rails at a predetermined position is built in the car seat.

The slide locking device, as shown in the aforesaid gazette, is so constructed that a lock plate having locking teeth is fixed to each lower rail, a lock shaft at the driving side having a handle and made controllable thereby is rotatably supported to one of the upper rails, a lock shaft at the driven side cooperative with rotation of the driving side lock shaft is rotatably supported to the other, and lock levers each having an engaging member engageable or disengageable with or from one of the locking teeth are fixed to the lock shafts respectively.

In addition, the lock shafts associate with each other through a wire so that the driving side lock shaft is rotatably operated and the driven side lock shaft rotates following the rotation of driving side lock shaft, thereby engaging or disengaging the engaging member with or from the locking teeth.

At the slide locking unit, between the driving side and driven side lock shafts and the upper rail side members for supporting the lock shafts are separately interposed torsion coil springs for biasing the engaging members in the direction of engaging with the locking teeth, so that the driving side lock shaft is rotatably operated to deflect the torsion coil spring, thereby disengaging the engaging member at each lock lever from the locking teeth, and the same is released to engage the engaging member with the locking teeth by a restoring force of the torsion coil spring.

In the above-mentioned construction, however, since the torsion coil springs for locking must be mounted to both the lock shafts, the number of parts increases and machining work is required to form a retaining groove at each lock shaft for retaining one end of the torsion coil spring to the lock shaft.

Also, a spring load of deflecting the torsion coil spring when the handle is rotated for lock-releasing is notlinear as shown by the dotted line in FIG. 6, thereby having the defect that the handle is not released in a good feeling. The reason for the above will be described in accordance with FIG. 6.

Usually, the slide locking device sets the locking spring and a range of stroke of the handle. At first, the spring is decided on the basis of a maximum spring load W max. not-hindering fatigue strength and release operation, and of a minimum spring load W min. enough to reliably lock the slide of seat when slidably operated, and nextly a stroke range of the handle corresponding to the maximum and minimum spring loads W max. and W min. is decided.

The torsion coil spring, when subjected to a load, deflects not only at an effective coiled portion but also at both ends, thereby having the mon-linear characteristic that the relationship between the displacement and the spring load downwardly curvs as shown by the dotted line in FIG. 6. As a result, an operating stroke $S_1$ between the maximum spring load W max. and the minimum spring load W min. is smaller than that $S_2$ for the linear characteristic, so that the smaller stroke must correspond to variation in a large spring load, thereby deteriorating a feeling of release operation.

SUMMARY OF THE INVENTION

An object of the present invention is to provide a slide locking device for a car seat, which is smaller in part number, requires no special machining for a lock shaft, and has a good feeling of release operataion.

In order to atatin the above object, the slide locking device of the invention stretches between the driving side and driven side lock levers or between the members in assocation therewith a tension coil spring for biasing an engaging portion at each lock lever in the engaging direction therewith.

In greater detail, the present invention is characterized by providing; a pair of lock plates fixed to the car body under both widthwise sides of the car seat and having a plurality of locking retained portions; a pair of lock shafts disposed at both widthwise sides of the lower surface of the car seat rotatably supported thereto and comprising a driving side lock shaft and a driven side lock shaft association therewith; a driving side lock lever and a driven side lock lever each having an engaging portion engageable with one of the retained portions at the lock plate, supported to each lock shaft, and swingable widthwise of the car body by rotation of the lock shaft; association means for rotating the driven side lock shaft in association with rotation of the driving side lock shaft; and a tension spring stretched between the driving lock shaft and the driven side lock shaft so as to bias the engaging portion at each lock lever in the direction of engaging with the retained portion at the lock plate, so that the one tension spring operates to elastically engage the engaging portion at each lock lever with the retained portion at the lock plate.

Accordingly, the slide locking device of the invention can ensure a locking force only by stretching the one tension coil spring between the driving side lock lever and the driven side lock lever or between the members in association with the lock levers. Hence, the number of parts can be saved and machining, such as grooving to the lock shaft, is not required.

Also, since the tension coil spring has the spring characteristic of linear relationship, and an operation stroke between the maximum spring load W max. and the minimum spring load W min. can be made larger than that of the torsion coil spring, thereby having the effect of improving the feeling for releasing operation of the handle.

BRIEF DESCRIPTION OF THE DRAWINGS

FIG. 1 is a plan view of a first embodiment of a slide locking device of the invention, FIG. 2 is a sectional view taken on the line II—II in FIG. 1, FIG. 3 is a sectional view taken on the line III—III in FIG. 1.

DETAILED DESCRIPTION OF THE INVENTION

Referring to FIGS. 1 through 4, a first embodiment of the slide locking device of the invention is shown.

In a well-known construction of supporting a car seat to a car body in relation of being slidable longitudinally thereof, slide rails 1 and 2 comprising lower rails 1a and 2a and upper rails 1b and 2b are disposed at both lateral sides of the lower surface of a car seat S schematically shown by the chain line in FIG. 2, the lower rails 1a and 2a being fixed onto the car body ( not shown ), and the upper rails 1b and 2b being fixed to the lower surface of the car seat S.

Figure 4:
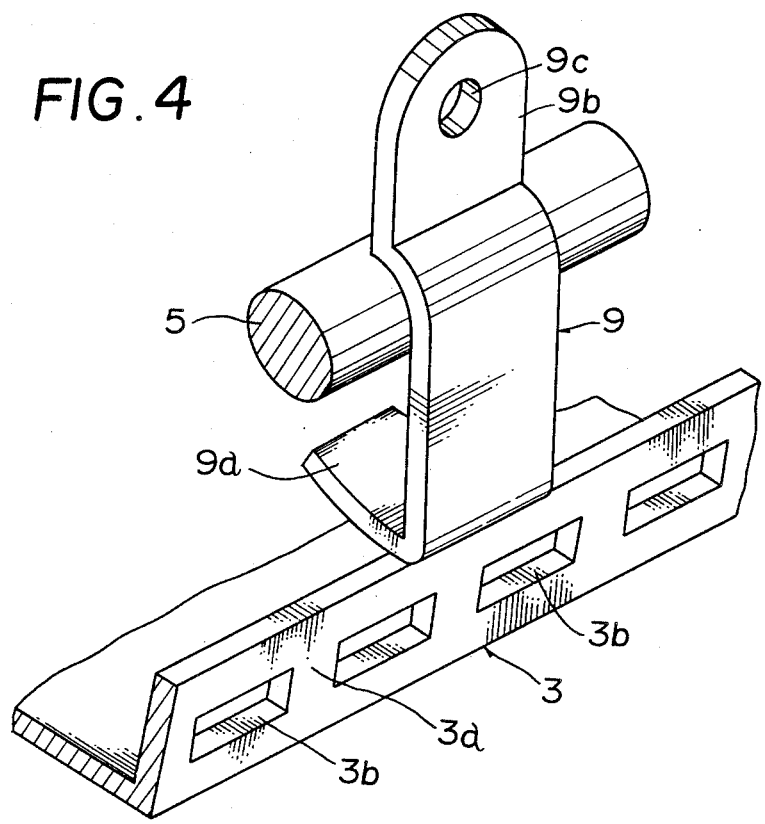
FIG. 4 is a perspective enlarged view of a lock lever and a lock plate.

The slide locking device locks the car seat S at a predetermined position longitudinally of the car body and is so constructed that lock plates 3 and 4 are fixed to the lower surfaces of lower rails 1a and 2a, upward rising portions 3a and 4a are provided at the opposite inner ends of the lock plates 3 and 4, and at the rising portions 3a and 4a are formed a plurality of through bores of the locking retained portions ( to be hereinafter called the lock bores ) spaced at regular intervals longitudinally of the car body as shown in FIG. 4. To the upper rails 1b and 2b have fixed bracket members 7 and 8 extending inwardly and opposite to each other and having bearings 7a and 8a at the ends of the inward extensions of the same. A driving side lock shaft 5 having at one axial end thereof an operating handle 5a is rotatably supported to the bearing 7a at the bracket member 7, a driven side lock shaft 6 rotatable in association with the driving side lock shaft 5 being rotatably supported to the bearing 8a at the bracket member 8.

A driving side lock lever 9 and a driven side lock lever 10 are fixed by welding or the like to the driving side lock shaft 5 and driven side lock shaft 6 at lengthwise intermediate portions thereof respectively and opposite to each other.

Now, referring to FIG. 4, at the lower end of each lock lever 9 or 10 is integrally formed each engaging portion 9a or 10a bent widthwise outwardly of the car body, and at the upper end of the same is integrally formed each spring support portion 9b or 10b upwardly projecting above each lock shaft 5 or 6 and having each retaining bore 9c or 10c. Between the spring support portions 9b and 10b is stretched one tension coil spring 11 for biasing engaging portions 3a and 4a at the lock levers 9 and 10 in the directions of engaging with the locking retaining portions 3a and 4a at the lock plates 3 and 4.

The engaging portions 9a and 10a are tapered toward the utmost ends to be engageable without causing a backlash, the tension coil spring 11 being retained at both ends thereof into the retaining bores 9c and 10c respectively.

In the above-mentioned construction, a tensile force of tension coil spring 11 biases the driving side and driven side lock levers 9 and 10 widthwise outwardly of the car body, so that the engaging portions 9a and 10a at the lock levers 9 and 10 reliably engage with the lock bores 3b and 4b. A wire bracket 12 rising upwardly is fixed to the driving side lock shaft 5 and a wire bracket 13 hanging downwardly is fixed to the driven side lock shaft 6, both wire brackets 12 and 13 being connected therebetween by a wire 14, so that the driving side lock shaft 5 is rotated and the driven side lock shaft 6 rotates in association therewith in the reverse direction thereto.

Figure 6:
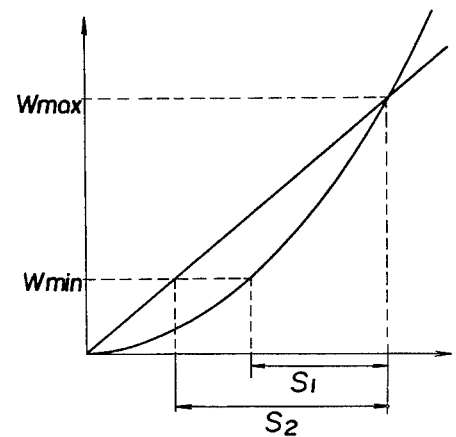
FIG. 6 is a characteristic view of the relationship between a tension coil spring and a torsion coil spring.

Thus, one tension coil spring is merely stretched between the driving side and driven side lock levers 9 and 10, thereby obtaining the locking force. Hence, the number of parts is reducible more than the conventional constuction of providing the torsion coil springs at the lock shafts respectively, also the lock shafts 5 and 6 need not be provided with engaging grooves for the torsion coil springs, and machining can be saved to that extent. Since the displacement and spring load of the tension coil spring 11 has therebetween the linear relation as shown in FIG. 6, the operation stroke $S_2$ between the maximum spring load W max. and the minimum spring load W min. can be made larger than $S_1$ of torsion coil spring. In other words, the reaction to operation of the handle does not abruptly increase during the releasing stroke and variation in spring load per a stroke is less, thereby being advantageous in that a good feeling is obtained for releasing the handle 5a.

Alternatively, each lock lever may be provided with a lock bore and each lock plate with toothed engaging portions.

Figure 5:
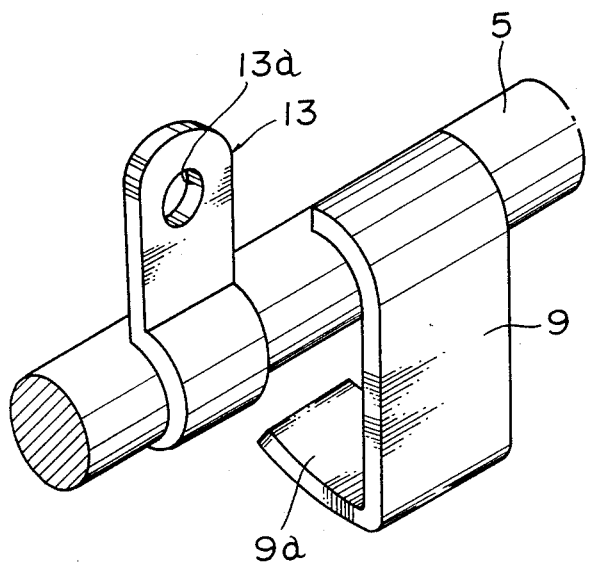
FIG. 5 is a perspective view of a second embodiment of the invention, corresponding to FIG. 4.

Alternatively, as shown in a second embodiment in FIG. 5, spring supports 13 having retaining bores 13a are provided separately from the lock levers 9 and 10 onto the lock shafts 5 and 6 and the tension coil spring may be stretched between the spring supports 13.

Also, the spring 11 may be retained at both ends directly to the spring supports 9b and 10b integral with the lock levers 9 and 10, so that the number of parts may be saved and separate retaining members need not be fixed to the lock shafts, thereby simplifying construction of the device.

Although several embodiments have been described, they are merely exemplary of the invention and not to be constructed as limiting, the invention being defined solely by the appended claims.

What is claimed is:

1. A slide locking device for locking slide motion of a car seat slidable longitudinally of a car body, provided with,
    (a) a pair of lock plates fixed to said car body at both sides thereof under said car seat and each having a plurality of locking retained portions,
    (b) a pair of lock shafts disposed at both sides of the lower surface of said car seat and rotatably supported thereto, comprising a driving side lock shaft and a driven side lock shaft rotatable in association with said driving side lock shaft,
    (c) a driving side lock lever and a driven side lock lever each having an engaging portion engageable with one of said retained portions at each of said lock plates, supported to said lock shaft, and swingable of widthwise of said car body by rotation of said lock shaft,
    (d) association means for rotating said driven side lock shaft in association with rotatable operation of said driving side lock shaft, and
    (e) a tension coil spring stretched between said driving side lock shaft and said driven side lock shaft and for biasing said engaging portions at said lock levers in the direction of engaging with said retained portions at said lock plates, said one tension coil spring operating to elastically engage said engaging portion of each of said lock levers with said retained portion at each of said lock plates.

2. A slide locking device for a car seat according to claim 1, wherein said lock plates are provided with spring supports having retaining bores for retaining both lengthwise ends of said tension coil spring respectively.

3. A slide locking device for a car seat according to claim 2, wherein said spring supports are integral with said lock plates respectively.

4. A slide locking device for a car seat according to claim 1, wherein said lock shafts are provided with spring supports swingable together with said lock levers and said tension coil spring is stretched between said spring supports.

* * * * *